United States Patent [19]

Rauh

[11] Patent Number: 5,019,420

[45] Date of Patent: May 28, 1991

[54] PROCESS FOR FORMING A REDUCED ELECTROCHROMIC LAYER IN CONTACT WITH AN ION CONDUCTING OXIDE

[75] Inventor: R. David Rauh, Newton, Mass.

[73] Assignee: EIC Laboratories, Inc., Norwood, Mass.

[21] Appl. No.: 297,760

[22] Filed: Jan. 17, 1989

[51] Int. Cl.⁵ .......................... G02F 1/01; B05D 5/12
[52] U.S. Cl. ........................... 427/126.3; 427/126.5; 427/162; 427/255.2; 427/383.5; 427/419.3; 427/166; 427/167; 350/357
[58] Field of Search .................... 427/77, 78, 108, 109, 427/165, 166, 167, 168, 169, 126.2, 126.3, 255.3, 419.3, 419.4, 162, 255.8, 383.5; 350/357

[56] References Cited

U.S. PATENT DOCUMENTS

| | | | |
|---|---|---|---|
| 4,170,406 | 10/1979 | Giglia et al. | 350/357 |
| 4,253,742 | 3/1981 | Morita | 350/357 |
| 4,282,272 | 8/1981 | Matsuhiro et al. | 427/126.3 |
| 4,308,658 | 1/1982 | Yano et al. | 427/126.3 |
| 4,347,265 | 8/1982 | Washo | 427/126.3 |
| 4,474,828 | 10/1984 | Young et al. | 427/126.3 |

FOREIGN PATENT DOCUMENTS

| | | | |
|---|---|---|---|
| 55-80482 | 6/1980 | Japan | 427/126.3 |
| 59-065827 | 4/1984 | Japan | 350/357 |

OTHER PUBLICATIONS

Yoshimura et al., *Jap. J. of Appl. Phys.*, vol. 22, No. 1, Jan. 1983, pp. 152-156.
Oi, *Appl. Phys. Latt.*, 37(2), 15 Jul. 1980, pp. 244-245.
Haas et al., *Proc. SPIE*, vol. 823, p. 81, 1987.

*Primary Examiner*—Norman Morgenstern
*Assistant Examiner*—Margaret Bueker
*Attorney, Agent, or Firm*—Fish & Richardson

[57] ABSTRACT

A process, based on sputtering from metal sources, is disclosed for forming a stable, reduced electrochromic layer in contact with an ionically conducting oxide. A deposited electrochromic layer is reduced by sputtering onto it an alloy or composite metallic thin film capable of injecting insertion atoms into the electrochromic layer. The metallic thin film, now partially depleted in insertion atoms, is converted into an electronically insulating but ionically conducting oxide layer in an oxidizing atmosphere. The resultant two-layer structure, consisting of the reduced electrochromic layer capped by the insulating oxide, may be used as on component in an all solid-state electrochromic device.

7 Claims, 2 Drawing Sheets

PROCESS FOR FORMING A REDUCED ELECTROCHROMIC LAYER IN CONTACT WITH AN ION CONDUCTING OXIDE

BACKGROUND OF THE INVENTION

This invention relates to the manufacture of electrochromic devices for modulation of light transmission, absorption and reflection.

Electrochromic materials are materials whose optical properties can be reversibly altered in response to an applied potential in a process involving the simultaneous insertion or extraction of electrons and charge compensating ions. These materials have been used, e.g., in display devices, variable reflectance mirrors, and in windows for controlling light transmission.

In general, devices having a composite whose transmittance can be varied in response to an applied electrical potential are known. The composite includes a variably transmissive electrochromic layer that is normally colorless, but when reduced by the insertion of an electron and charge compensating ion becomes colored by absorption, reflectance or a combination of both. The composite also includes a second electrochromic layer, a so-called counter electrode, which is either optically passive when oxidized or reduced, or is colored when oxidized and colorless when reduced, thus forming a complement with the first electrochromic layer. The oxidation and reduction of the counter electrode must also occur by electron injection and insertion of the same charge compensating ion as the first electrochromic layer. The charge compensating ions are transported by an ion conducting but electron blocking layer, e.g. an electrolyte, separating the two electrodes.

A general equation representing the operation of the device in which $WO_3$ is the primary electrochromic layer, $V_2O_5$ the counter electrode, and $Li^+$ the transported ion can be written as:

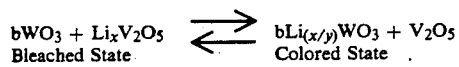

Here, b denotes that the two electrode materials need not be present in any special molar ratio. The degree to which the counter electrode $V_2O_5$ is reduced in the bleached state is given by the stoichiometric parameter x. Coloration is accomplished by the transfer of Li from $V_2O_5$ to $WO_3$. Thus, assuming that $V_2O_5$ is the limiting electrode and that therefore sufficient $WO_3$ is present to accept all of the available Li, the dynamic optical range of the device will be determined by the amount of Li present.

The inserting species, Li, must be introduced during fabrication. This can be accomplished by several methods, including direct vapor deposition of $Li_xV_2O_5$ (or other counter electrode), its reduction by elemental Li in a separate step, or electrochemical reduction of the counter electrode layer in an electrolytic solution of $Li^+$. Alternatively, the Li may be introduced initially into the primary electrochromic layer ($WO_3$ in the above equation), using similar methods; or the Li may be distributed between both electrodes by the same means, the resulting as-fabricated structure being in some intermediate state of coloration. In a large scale process vapor deposition is preferred, so that the multiple layers of the structure can be deposited on an in-line, continuous basis, as in a series of box coaters. In coating evenly large area glass or plastic for architectural or vehicular applications, sputtering is presently the industry standard.

In order to fabricate the device structure in FIG. 1 by vacuum processing such as by sputtering, the layers must be deposited in sequence, one on top of the other. For high sputter rates consistent with economical processing of large surface areas, sources with a high electrical conductivity are preferred. Since the component layers are oxides, they must be deposited in an oxidizing atmosphere, such as in pure $O_2$, $Ar/O_2$ or $O_2/H_2O$—i.e., they must be reactively sputtered from targets of the parent metals. The Li (or other insertion atom) must be deposited in a reducing or inert atmosphere, however. The resulting compounds, $Li_xV_2O_5$ or $Li_xWO_3$ for example, are easily oxidized. In fabricating an ion conducting layer on top of the reduced electrochromic layer, the $Li^+$ conducting glass $Li_4SiO_4$ or $LiAlSiO_4$ for example, it is necessary to expose it to an oxidizing atmosphere. There are several examples of prior art in which $WO_3$ is converted to $Li_xWO_3$ by vacuum deposition, then capped with an ion conductor. Yoshimura et al. (Japanese Journal of Applied Physics 22, 152 (1983)) reported spontaneous coloration when $WO_3/Li_2WO_4$ bilayers were allowed to sit in contact for a day, the intensity of coloration being proportional to the $Li_2WO_3$ thickness. Oi (Applied Physics Letters 37, 244 (1980)) demonstrated the evaporation of $Li_3N$ onto $WO_3$, which gave rise initially to dry injection of the Li to form $Li_xWO_3$(evolving $N_2$), but eventually the $Li_3N$ ion conductor built up on the $WO_3$. Optical switching was further demonstrated in an ITO:$Li_x$-$WO_3$:$Li_3N$:Al structure polarized between $\pm 6V$. Problems with this approach include the red coloration of $Li_3N$, the fact that it cannot be conveniently sputtered, and that it would be easily oxidized on deposition of the contiguous counter electrode and conductive oxide layers. Haas, Goldner et al. (Proc. SPIE 823, 81 (1987)) reported deposition of the ion conductor $LiNbO_3$, onto $WO_3$, which resulted in spontaneous lithiation of the $WO_3$. Optical 01 switching devices were configured and demonstrated using $V_2O_5$ or $In_2O_3$ as the counter electrode. A problem with this approach is that $LiNbO_3$ has an electrical conductivity that is too high, particularly in the Li-depleted state, resulting in parasitic dc current flow during device operation.

It is therefore an object of the present invention to provide a process for reducing the electrochromic layer, then "capping" it with an ion conducting oxide without oxidizing the former material. The subsequent layers may then be deposited onto this "capped" layer without oxidizing significantly the reduced electrochromic underlayer.

It is a further object of this invention to achieve this deposition sequence using metallic sources, for high sputtering rates, and using targets that can be handled reasonably in the open air (i.e. are not pure alkali metals).

The features and advantages of the invention will be apparent from the following detailed description and appended claims when taken with the drawings;

DETAILED DESCRIPTION

Figure 1:
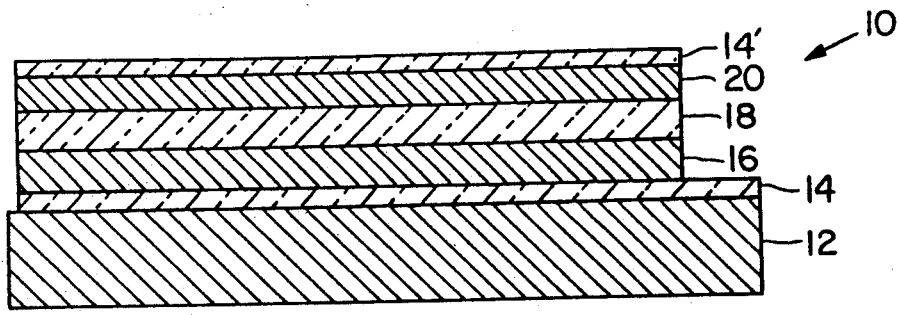
FIG. 1 is a fragmentary cross sectional view of an electrochromic device with a solid electrolyte and an all thin film construction.
Figure 2A:
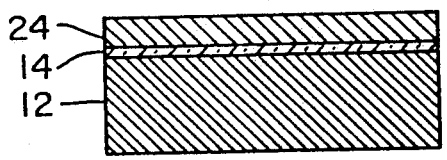
FIGS. 2A-2E are fragmentary cross-sectional views illustrating the fabrication sequence taught by this invention.
Figure 2B:
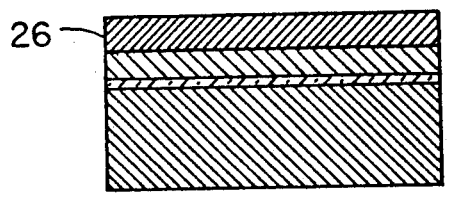
Figure 2C:
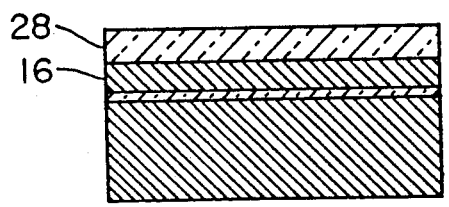
Figure 2D:
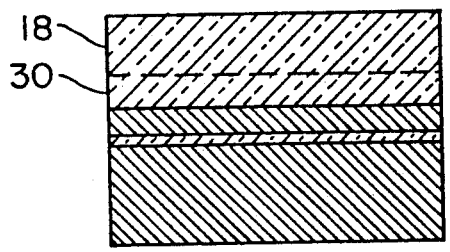
Figure 2E:
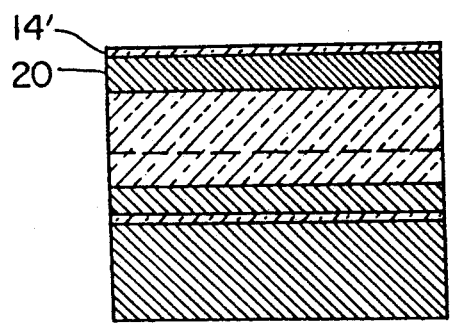

Referring to Figure there is shown a cross sectional view of an electrochromic device modulating light transmission, absorption or reflection. Device 10, as described in the Background of the Invention, requires that the following layers be deposited in sequence on substrate 12; 1) a transparent electrical conductor 14 such as Sn-doped $In_2O_3$ (ITO); 2) a reduced primary electrochromic layer 16, such as $Li_xWO_3$; 3) a solid ion conductor 18, such as a mixture of $Li_2O$ and $SiO_2$; 4) a counter electrode 20, such as $V_2O_5$; 5) a top transparent electrical contact 14', as in 1). Layers 16 and 20 can be reversed in position, e.g. as $Li_xV_2O_5$. FIG. 2 shows the fabrication sequence A-E of the structure in cross section. The first two layers are deposited in an oxidizing atmosphere on substrate 12, these being 14 (e.g., ITO) and the fully oxidized electrochromic layer 24 (e.g., $WO_3$). Next deposited is layer 26, a key aspect of this invention. Layer 26, deposited in a reducing atmosphere, is a composite which is thermodynamically capable of injecting Li (or other insertion atom) into layer 24, converting it on contact to the reduced electrochromic layer 16 (e.g., LixWO3). Layer 26, on donating its Li, is converted to layer 28, a precursor to the ion conductor. An example of layer 26 is a Li/Si alloy, while 28 is a Li-depleted Si layer. Next, layer 18 is deposited in an oxidizing atmosphere. The oxidizing plasma, including charged and neutral oxygen and oxide moieties, oxidize the protective "capping" layer 28 to an interfacial ion conductor 30, while depositing the main ion conductor 18. Layer 16 is substantially shielded from the oxidizing atmosphere during this conversion/deposition process. An example of layer 30 is $(Li_2O)_xSiO_2$, the value of x depending on the amount of uninjected Li remaining from layer 26. An example of layer 18 is $Li_4SiO_4$. Finally, to complete the structure, counter electrode and top ITO contact layers 20 and 14' are deposited in an oxidizing atmosphere.

In choosing the composition and thickness of injecting layer 26, the following reaction must be thermodynamically favorable:

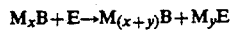

$$M_xB + E \rightarrow M_{(x+y)}B + M_yE$$

where B is the injecting layer host material (e.g., Si), M is the injected atom (e.g., Li, Na, H), and E is the fully oxidized electrochromic layer 24. In some systems, such as $Li_xWO_3$ and $Li_ySi$, the free energies of formation of the insertion compounds are known with accuracy over a wide range of stoichiometric parameters x and y. The equilibrium composition represented at the right side of the above equation is that in which the free energies of the two contiguous solid layers are equalized. In general, sufficient $M_xB$ must be deposited to produce $M_yE$ with the desired optical density.

Examples of candidate materials which will inject a small alkali atom and be precursors for highly insulating ion conductors are: 1) simple binary alloys incorporating Li, Na or H in a host whose oxide is highly insulating, e.g. Al, B, Ga, Ge, Mg, P, and Si; 2) multicomponent alloys or mixtures that are precursors to known oxide ion conductors, achieved by adding precursors of the following glassy network modifiers to the binary alloys: Ca, Ba, Mg, Zn; 3) combinations of compositions in 1) and 2) and nonmiscible insulating metal oxide precursors: Nb, Ta, Zr.

The amount of the interfacial layer required to provide the needed insertion atoms is sufficiently small that the interfacial oxide may have a relatively low ionic conductivity. For example, $WO_3$ has a maximum visible coloration efficiency (slope of optical density vs. injected charge) of approximately 100 cm²/coulomb Thus, $10^{-2} C/cm^2$, or $10^{-8}$ equivalents/cm² of injected atoms (e.g., Li) are cm² required. A 50:50 Li/Si alloy has a density of about 1.5 g/cm³. Thus $10^{-7}$ equivalents/cm² are contained in a thickness of less than $3 \times 10^{-6}$ cm. To pass the full 10 mC/cm² in 10 seconds would require a current density of $10^{-3}$ A/cm². If the interfacial layer had an ionic resistivity or $10^8$ ohm-cm, then its resistance would be 300 ohms, and the voltage drop 0.3V.

Figure 3A:
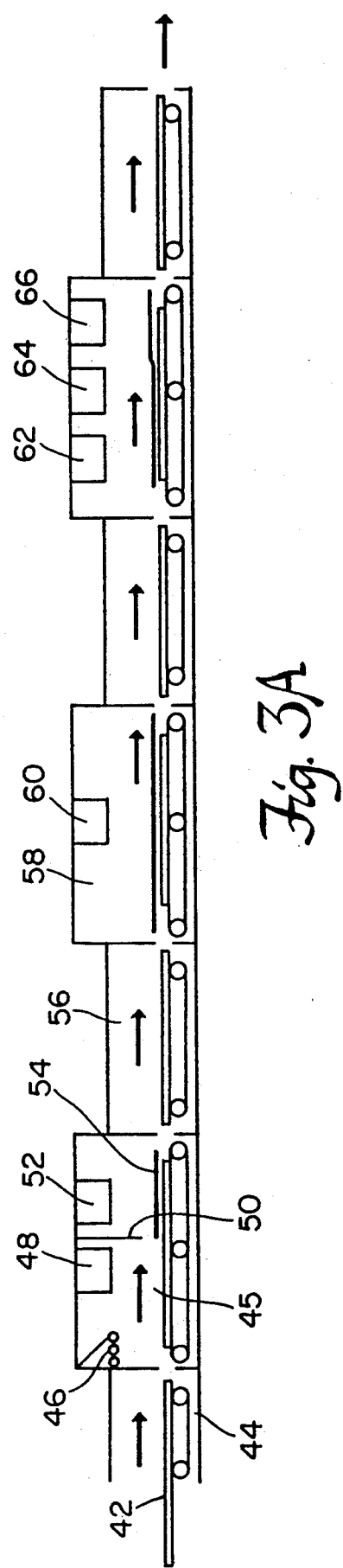
FIGS. 3A and 3B show schematic drawings of a chain of sputter box coaters for depositing solid state multilayer electrochromic light modulators employing the process described herein.
Figure 3B:
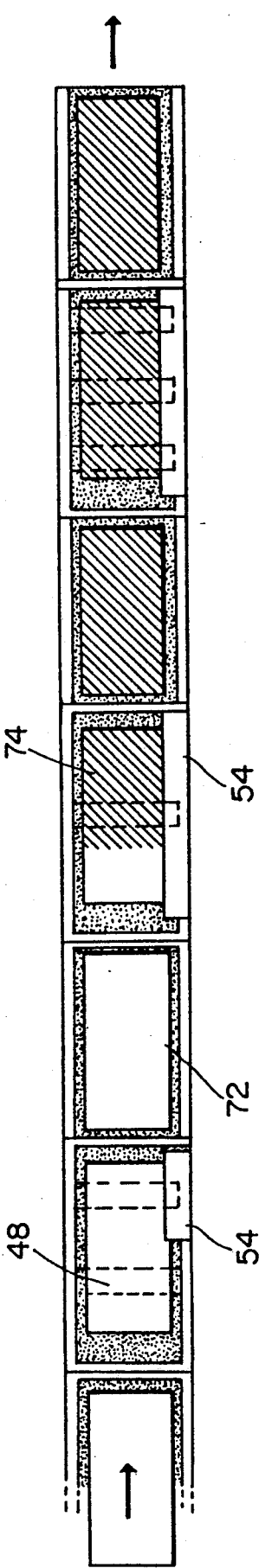

FIGS. 3A and 3B show a schematic sectional side view and a sectional top view of a string of box-type sputter coaters for depositing the contiguous layers of the electrochromic modulator onto a planar substrate. Substrate 42 is passed through the individual chambers via a conveying device, e.g., network of conveyor belts 44. It passes into first chamber 45 which is maintained at reduced pressure in an oxidizing atmosphere. Substrate heating may be desirable for depositing the initial layers, and is provided in this example by quartz lamps 46. Sputter sources 48 and 52 are used to deposit the conductive oxide (e.g. ITO) and first electrochromic layer (e.g. $WO_3$), respectively. As the $WO_3$ is being deposited, the substrate passes beneath masking lip 54, thus exposing an edge of underlying ITO 72, for later contact. Baffle 50, separates the two sources and prevents contamination of this contact area from source 48.

The substrate is then transferred through intermediate isolation chamber 56 into chamber 58. Chamber 58 is maintained at reduced pressure in a reducing or neutral atmosphere. Sputtering is carried out from source 60, which comprises the Li-containing materials for Li injection, e.g. Li/Si alloy. Area 74, on which the Li source is deposited becomes colored. The substrate is then transferred via an intermediate chamber to a third chamber, maintained at a reduced pressure in an oxidizing atmosphere. The sources for ion conductor 62, counter electrode 64, and top transparent contact 66 are arranged sequentially, so that these contiguous layers are deposited in the same order. The oxidizing plasma atmosphere also converts to the oxide the ion conductive precursor deposited in chamber 58. Final electrical contacts to the window are made at the two outer edges.

Other embodiments are within the claims.

What is claimed is:

1. A process for forming a stable reduced electrochromic layer in contact with an electronically insulating but ionically conducting oxide layer comprising, depositing an electrochromic layer upon a substrate, depositing upon the deposited electrochromic layer a metallic thin film capable of injecting insertion atoms into said electrochromic layer which metallic thin film is from the group consisting of a metallic alloy and a metallic composite to form a resultant layered structure, and exposing said resultant layered structure to an oxidizing atmosphere to convert said metallic thin film into an oxide.

2. The process of claim 1 wherein the step of depositing said electrochromic layer comprises depositing amorphous $WO_3$.

3. The process of claim 1 wherein said step of depositing a metallic thin film comprises depositing a metallic thin film from the group consisting of an Li-Si alloy and an Li-Si composite.

4. A process for forming an electrochromic device comprising,
   depositing onto a substrate a transparent electrically conducting layer,
   depositing upon the deposited transparent electrically conducting layer an electrochromic layer,
   depositing upon the deposited electrochromic layer a metallic thin film capable of injecting insertion atoms into said electrochromic layer which metallic thin film is from the group consisting of a metallic alloy and metallic composite to form a resultant layered structure,
   depositing upon said resultant layered structure in an oxidizing atmosphere an ionically conducting oxide,
   depositing upon the deposited ionically conducting oxide a counter electrode,
   and depositing upon the deposited counter electrode a second transparent electrically conducting layer.

5. The process of claim 4 wherein the step of depositing said electrochromic layer comprises depositing amorphous $WO_3$.

6. The process of claim 4 wherein the step of depositing said metallic thin film includes depositing a metallic thin film of a material from the group consisting of Li-Si and Li-Al.

7. The process of claim 5 wherein the step of depositing said metallic thin film includes depositing a metallic thin film of a material from the group consisting of Li-Si and Li-Al.

* * * * *